US009539930B2

(12) United States Patent
Geerlings

(10) Patent No.: US 9,539,930 B2
(45) Date of Patent: Jan. 10, 2017

(54) SYSTEMS AND METHODS FOR REAR VIEW MIRROR DISPLAYS

(71) Applicant: Gentex Corporation, Zeeland, MI (US)

(72) Inventor: Steven L. Geerlings, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 353 days.

(21) Appl. No.: 14/346,625

(22) PCT Filed: Sep. 21, 2012

(86) PCT No.: PCT/US2012/056640
§ 371 (c)(1),
(2) Date: Mar. 21, 2014

(87) PCT Pub. No.: WO2013/044077
PCT Pub. Date: Mar. 28, 2013

(65) Prior Publication Data
US 2014/0300457 A1   Oct. 9, 2014

Related U.S. Application Data

(60) Provisional application No. 61/538,252, filed on Sep. 23, 2011.

(51) Int. Cl.
B60Q 1/00 (2006.01)
G07C 9/00 (2006.01)
B60R 1/00 (2006.01)

(52) U.S. Cl.
CPC . *B60Q 1/00* (2013.01); *B60R 1/00* (2013.01); *G07C 9/00309* (2013.01);
(Continued)

(58) Field of Classification Search
CPC .... G07C 9/00182; G07C 9/00309; B60Q 1/00
(Continued)

(56) References Cited

U.S. PATENT DOCUMENTS 6,388,559 B1    5/2002   Cohen
6,396,408 B2*   5/2002   Drummond ............. B60R 1/088
                                                      340/12.3
(Continued)

FOREIGN PATENT DOCUMENTS

CN   201405781 Y   2/2010
CN   201525328 U   7/2010
(Continued)

OTHER PUBLICATIONS

Office Action dated Jul. 1, 2015, received in corresponding Chinese application No. 201280055804.0, and English translation, 16 pages.
(Continued)

*Primary Examiner* — Tai Nguyen
(74) *Attorney, Agent, or Firm* — Foley & Lardner LLP; Bradley D. Johnson

(57) ABSTRACT

A system for coupling to a vehicle and for causing actuation of a remote device via a control signal transmission includes a transmitter for causing the control signal transmission to the remote device. The system further includes a circuit configured to cause a back-up display to indicate status of the remote device in response to a status determination.

20 Claims, 10 Drawing Sheets

(52) U.S. Cl.
CPC ............... *G07C 9/00896* (2013.01); *G07C 2009/00507* (2013.01); *G07C 2009/00928* (2013.01); *G07C 2209/62* (2013.01)

(58) Field of Classification Search
USPC ............ 340/438, 435, 436, 5.7, 5.71, 3.32, 686.1, 340/12.1
See application file for complete search history.

(56) References Cited

U.S. PATENT DOCUMENTS

| | | | | |
|---|---|---|---|---|
| 7,734,392 | B2* | 6/2010 | Schofield | B60R 1/12 340/438 |
| 2006/0202815 | A1* | 9/2006 | John | G08B 21/14 340/531 |
| 2010/0127882 | A1* | 5/2010 | Sitarski | E05F 15/77 340/686.1 |
| 2010/0171588 | A1* | 7/2010 | Chutorash | G07C 9/00182 340/5.71 |
| 2011/0043328 | A1 | 2/2011 | Bassali | |
| 2011/0109746 | A1 | 5/2011 | Schofield et al. | |
| 2014/0320263 | A1* | 10/2014 | Fan | E05F 15/77 340/5.71 |

FOREIGN PATENT DOCUMENTS

| | | |
|---|---|---|
| CN | 201784532 U | 4/2011 |
| WO | WO-2008/094383 A1 | 8/2008 |

OTHER PUBLICATIONS

International Search Report received in PCT/US2012/056640 dated Jan. 7, 2013.
Office Action in corresponding Chinese Application No. 201280055804.0 dated Feb. 26, 2016, and English translation, 18 pages.

* cited by examiner

SYSTEMS AND METHODS FOR REAR VIEW MIRROR DISPLAYS

CROSS-REFERENCE TO RELATED APPLICATIONS

The present application is a National Stage of International Application No. PCT/US2012/056640 filed on Sep. 21, 2012, which claims the benefit of U.S. Provisional Application No. 61/538,252 filed on Sep. 23, 2011, the entire disclosures of which are incorporated herein by reference.

BACKGROUND

The present disclosure generally relates to the field of vehicles. The present disclosure relates more specifically relates to wireless control systems for a vehicle and a remote electronic system in communication with the vehicle.

Conventional systems for controlling appliances and remote devices, such as garage door openers, security gates, home alarms, and lighting systems, use individual remote controls to operate a respective appliance and/or device. With such a conventional system, it is difficult to control multiple remote devices, much less consolidate operation of the remote devices into a single, controllable system. For example, garage door opener mechanisms open and close a garage door in response to a radio frequency control signal. The control signal is typically generated and transmitted from a remote control that is sold with the garage opener. The control signal has a preset carrier frequency and control code such that the garage door opener mechanism is responsive only to the remote control issuing the associated control signal. A problem associated with this type of system is that the door opener must receive a specific predetermined control signal in order to be operated. That is, each appliance and device must receive a specific predetermined control signal. Therefore, a user wishing to control multiple devices is required to have multiple remote controls.

Communication systems currently exist which enable multiple appliances and devices to be controlled by a central or single remote device. One such system is HOMELINK®, owned by Johnson Controls, Inc., in which a trainable transceiver is able to "learn" characteristics of received control signals such that the trainable transceiver may subsequently generate and transmit a signal having the learned characteristics to a remotely controlled device. For example, one such system is disclosed in U.S. Pat. No. 5,854,593.

A user trains the trainable transceiver by, for example, transmitting a signal from a remote controller in the vicinity of the trainable transceiver. The trainable transceiver learns the carrier frequency and data code of the signal and stores this code for later retransmission. In this manner, the trainable transceiver can be conveniently mounted within a vehicle interior element (e.g., visor, instrument panel, overhead console, etc.) and can be configured to operate one or more remote electronic systems.

SUMMARY

One embodiment relates to a system for coupling to a vehicle and for causing actuation of a remote device via a control signal transmission. The system includes a transmitter for causing the control signal transmission to the remote device. The system further includes a circuit configured to cause a back-up display to indicate status of the remote device in response to a status determination.

Another embodiment relates to a system for a vehicle. The system includes a trainable transceiver, a back-up display; and back-up display electronics for controlling the back-up display. The trainable transceiver is configured to wait for an acknowledgement after transmitting a command to a remote device. The trainable transceiver is configured to report a status indication of the state of the remote device on the back-up display by providing information to the back-up display electronics and in response to whether or not the acknowledgement is received.

Another embodiment relates to a method for use by a vehicle control system. The method includes causing a transmitter of the vehicle control system to transmit a control signal to a remote device. The method also includes using a circuit of the vehicle control system to determine a status of the remote device. The method further includes updating a status indication for the remote device on a back-up display in electronic communication with the circuit. The vehicle control system may include a receiver and the determination may include the step of receiving information from the remote device at the receiver and using the circuit to recognize the information as an indication of remote device status. The back-up display may be coupled to a rear view mirror. The back-up display may be embedded within at least one of an instrument panel and a center stack. The status determination may include receiving an acknowledgement in response to the control signal transmission to the remote device. The back-up display's primary purpose may be to display video from a back-up camera while the vehicle is in reverse.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

The operator of a trainable transceiver often will activate the trainable transceiver to actuate a remote electronic system as a vehicle is either approaching or leaving the location of the remote electronic system. Often, the operator is not able to immediately ascertain whether the actuation of the device was successful. The actuation can fail based on signal interference, incomplete activation of the trainable transceiver, batter/power failures, or for a variety of other reasons. Unknown failure of the remote electronic system can cause concern, for example when a garage door fails to close as an operator drives away, leaving the garage door open and exposed. Accordingly, an operator is often forced to visually monitor the remote electronic system to ensure successful operation.

Referring generally to the figures, a wireless control system and method for control of a remote electronic system is shown and described. A trainable transceiver of the wireless control system is configured to receive a feedback signal from a remote electronic system indicating success or failure of a requested operation and/or status information. The feedback signal is stored in memory of the wireless control system for retrieval at a later period. In response to the retrieved feedback signal and status, the wireless control system may recall the status information and/or reissue a wireless control signal to the remote electronic system. Further, the wireless control system may use the feedback signal and status to update a rear view mirror display that shows status information to the driver of the vehicle.

Figure 1:
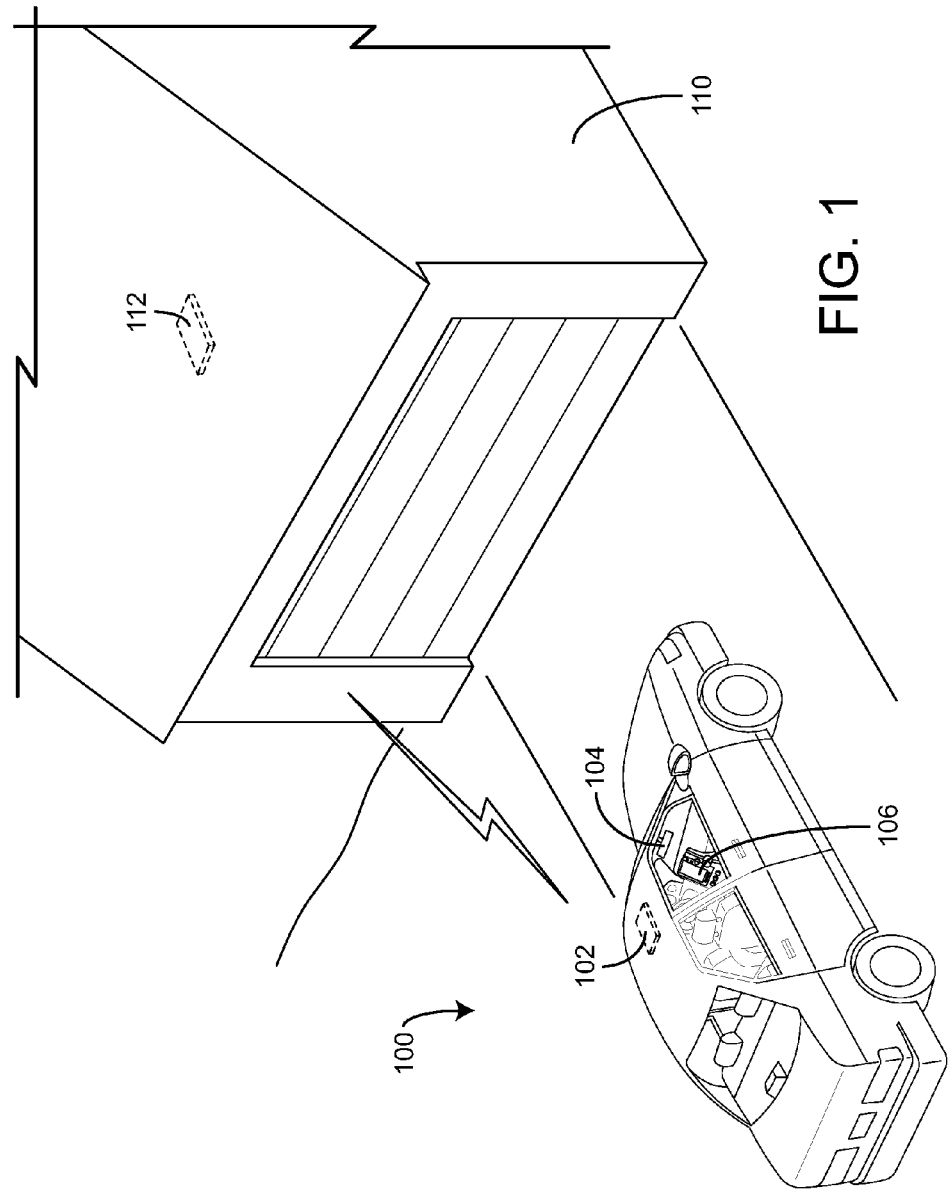
FIG. 1 is a perspective view of a vehicle and garage, according to an exemplary embodiment.

Referring to FIG. 1, a perspective view of a vehicle 100 and garage 110 is shown, according to an exemplary embodiment. Vehicle 100 may be an automobile, truck, sport utility vehicle (SUV), mini-van, or other vehicle. Vehicle 100 includes a wireless control system 102 which is shown mounted to an overhead console of vehicle 100. According to various exemplary embodiments, elements of wireless control system 102 may be mounted to other vehicle interior elements, such as a visor, instrument panel, mirror assembly 104, a center stack 106 or other control unit. Alternatively, wireless control system 102 may be mounted to a key chain, key fob, or other handheld or mobile device (e.g., cell phone, PDA, smart phone, etc.). Wireless control system 102 is configured to communicate with a remote electronic system 112 of a garage 110 or other structure. For example, in the embodiment of FIG. 1, remote electronic system 112 is configured to control garage 110 door operation. Wireless control system 102 can receive status information from remote electronic system 112 and cause an indication of the status of remote electronic system 112 to be displayed on a vehicle interior element.

Figure 2:
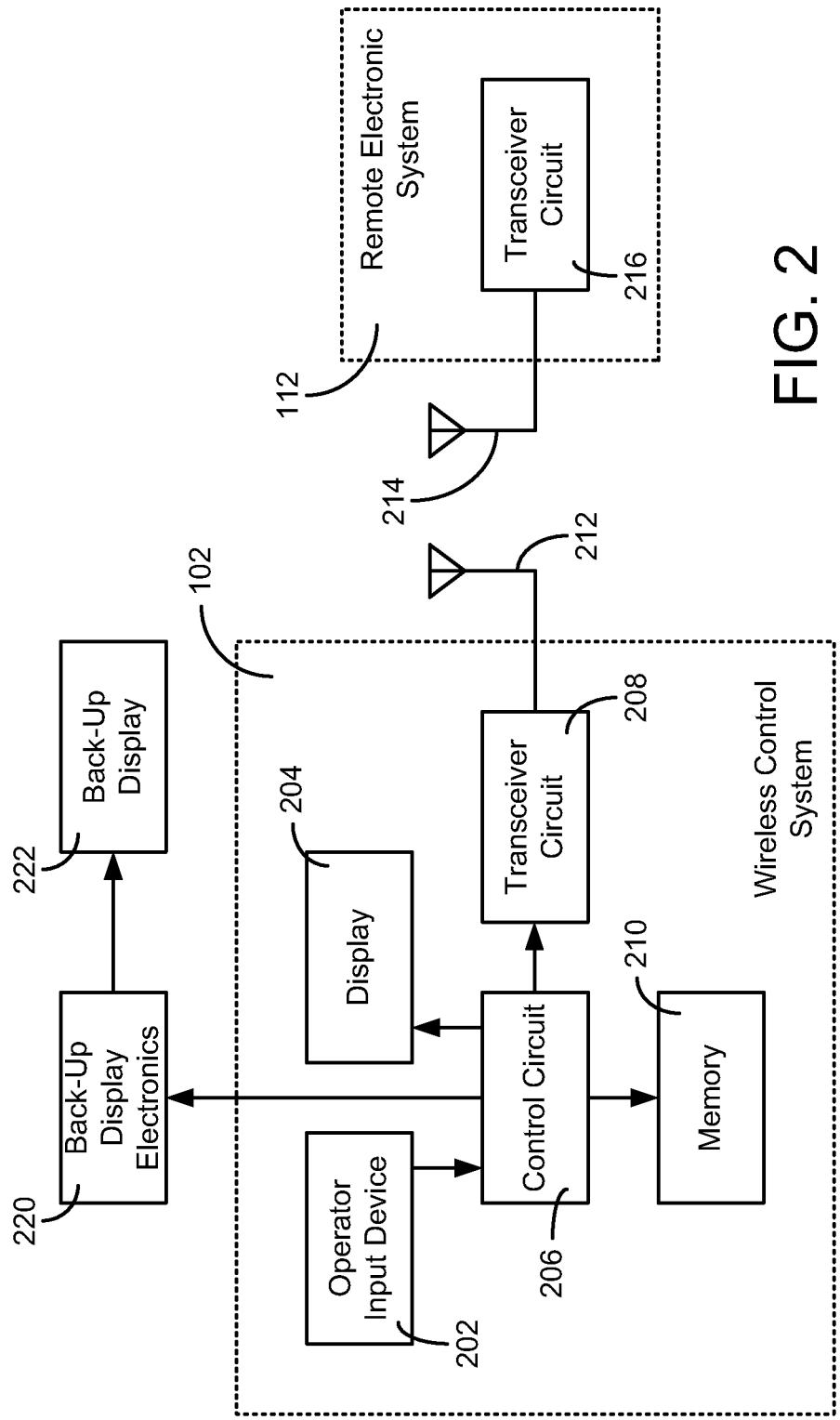
FIG. 2 is a block diagram of a wireless control system and remote electronic system, according to an exemplary embodiment.

Referring now to FIG. 2, a block diagram of a wireless control system 102 and remote electronic system 112 is shown, according to an exemplary embodiment. Remote electronic system 112 may be any of a plurality of remote electronic systems, such as a garage door opener (as shown in FIG. 1), security gate control system, security lights, remote lighting fixtures or appliances, a home security system, or another set of remote devices. Remote electronic system 112 includes a transceiver circuit 216 and an antenna 214. Transceiver circuit 216 includes transmit and/or receive circuitry configured to communicate via antenna 212 with wireless control system 102. Transceiver circuit 216 is configured to receive wireless control signals having control data which may control remote electronic system 112. For example, the control data may indicate a desire to cause a garage door to open or close.

Transceiver circuit 216 is further configured to transmit wireless status signals having status data indicating the current status of remote electronic system 112 and the device remote electronic system 112 controls. The status data on the wireless status signal may include a "SUCCESS" status indicative that the control signal sent by wireless control system 102 was properly received and the control function was successfully executed by remote electronic system 112. The wireless status signal may be sent upon completion of the function specified in the wireless control signal. The status data may also include an "ACKNOWLEDGE" status indicative that a proper wireless control signal was received by transceiver circuit 216. According to an alternative embodiment, remote electronic system 112 can send a plurality of "IN PROCESS" status signals until completion of the operation, whereupon a "SUCCESS" or "FAILURE" status signal may be sent. According to yet more alternative embodiments, the wireless status signal may include other information relevant to remote electronic system 112 for transmittal to wireless control system 102. For example, such information may include whether a garage door is open or closed or moving between an open and closed position. By way of further example, in response to a received control signal from a vehicle-mounted wireless control system 102, a garage door opener system may transmit the status messages of "OPENING", "CLOSING", "OPEN", and "CLOSED." Which status message is sent to the wireless control system depends on the actual status of remote electronic system 112. In addition to transceiver circuit 216, remote electronic system 112 can include any number of sensors (e.g., optical sensors, position sensors), logic circuits, algorithms, memory locations, or other electronics for determining or tracking the status of the remote electronic system 112's changeable component(s).

Wireless control system 102 includes a control circuit 206 configured to control the various portions of wireless control system 102. Control circuit 206 may include various types of control circuitry, digital and/or analog, and may include a microprocessor, microcontroller, application-specific integrated circuit (ASIC), or other circuitry configured to perform various input/output, control, analysis, and other functions to be described herein. Control circuit 206 may be coupled to an operator input device 202 which may include one or more push button switches, knobs, dials, a voice-actuated input control circuit configured to receive voice signals from a vehicle occupant, or other user input interfaces. Operator input device 202 provides such input signals to control circuit 206. In response to receiving input signals from operator input device 202, control circuit 206 can determine how to control of wireless control system 102 (e.g., whether to cause transceiver circuit 208 to generate a control signal for transmission to remote electronic system 112). A portion of operator input device 202 may be installed on, for example, a rearview mirror assembly. Such a configuration is shown in greater detail in FIGS. 4-10.

Control circuit 206 is communicably coupled to a display 204. Display 204 may include one or more LEDs for indicating that a button has been pressed, for facilitating a training process, for indicating status of the wireless control system, or for displaying other details involving the vehicle (e.g., miles per gallon, media player information, etc.). Display 204 may be part of a vehicle dashboard or center stack. In an exemplary embodiment, display 204 may be the main media/informatics display in the vehicle.

Memory 210 may be one or more devices (e.g., RAM, ROM, Flash memory, hard disk storage, etc.) for storing data and/or computer code for completing and/or facilitating the various processes, layers, and modules described in the present disclosure. Memory 210 may be or include volatile memory or non-volatile memory. Memory 210 may include database components, object code components, script components, or any other type of information structure for supporting the various activities and information structures of the present disclosure. Memory 210 may also or alternatively be configured to store status information received from remote electronic system 112 or derived by control circuit 206. In some exemplary embodiments, memory 210 is integrated with control circuit 206. Any computer code stored in memory 210 may be executed by control circuit 206 and/or a processor thereof.

Wireless control system 102 further includes a transceiver circuit 208 (e.g., a trainable transceiver) including transmit and/or receive circuitry configured to communicate via antenna 212 with remote electronic system 112. Transceiver circuit 208 is configured to transmit wireless control signals having control data for controlling remote electronic system 112. Transceiver circuit 208 is further configured to receive wireless status signals including status information from remote electronic system 112. Wireless control system 102 and remote electronic system 112 may communicate using any suitable wireless standard, including but not limited to Bluetooth, WiFi, WiMax, or protocols compatible with or proprietary to remote electronic system 112.

In a training mode of operation, remote electronic system 112 is configured to receive one or more characteristics of an activation signal sent from an original transmitter. An original transmitter is a transmitter, typically a hand-held transmitter, which may be sold with remote electronic system 112 or as an after-market item. The original transmitter may be configured to transmit an activation signal to remote electronic system 112 at a predetermined carrier frequency and having control data configured to actuate remote electronic system 112. For example, the original transmitter can be a hand-held garage door opener transmitter configured to transmit a garage door opener signal at a frequency (e.g., centered around 315 MHz or 355 MHz, etc.). The activation signal includes control data, which can be a fixed code, a rolling code, or another cryptographically-encoded code. Remote electronic system 112 may be configured to open a garage door, for example, in response to receiving the activation signal from the original transmitter. Transceiver circuit 208 (e.g., a trainable transceiver configured to communicate with the original transmitter) may be configured to receive one or more characteristics of the activation signal (e.g., frequency, control data, modulation scheme, etc.) from the original transmitter or from another source. In this embodiment, transceiver circuit 208 is configured to learn at least one characteristic of the activation signal by receiving the activation signal, determining the frequency of the activation signal, and demodulating the control data from the activation signal. Wireless control system 102 may be a HOMELINK® trainable transceiver, manufactured by Johnson Controls, Inc. Alternatively, wireless control system 102 can receive one or more characteristics of the activation signal by other methods of learning. For example, the one or more characteristics of the activation signal can be preprogrammed into memory during manufacture of wireless control system 102, can be input via operator input device 202 (which can include a key pad, buttons, etc.), or can be learned via a 'guess and test' method. In this manner, wireless control system 102 need not actually receive the activation signal from an original transmitter in order to receive characteristics of the activation signal. Wireless control system 102 may store the characteristics of the activation signal in memory 210.

Wireless control system 102 may be configured to integrate the original transmitter as part of the wireless control system (e.g., operation of the original transmitter may provide an activation signal to wireless control system 102 indicating the signal was also sent to remote electronic system 112). In some embodiments, on the other hand, wireless control system 102 eliminates the need for continued use of the original transmitter after training is complete.

Transceiver circuit 208 may be configured to, under control from control circuit 206, generate a carrier frequency at any of a number of frequencies. In some embodiments, the frequencies generated can be in the ultra-high frequency range (e.g., between 20 and 470 megahertz (MHz), between about 20 and 950 MHz, between about 280 and 434 MHz, up to 868 MHz, up to 920 MHz, up to 960 MHz, etc.) or in other frequency ranges. The control data modulated on to the carrier frequency signal may be frequency shift key (FSK) or amplitude shift key (ASK) modulated, or another modulation technique may be used. The control data on the wireless control signal may be a fixed code or a rolling code or other cryptographically encoded control code suitable for use with remote electronic system 112.

Control circuit 206 is coupled to back-up display electronics 220. Back-up display electronics 220 is configured to operate back-up display 222 (e.g., provide video or control signals to back-up display 222) as described above. In an exemplary embodiment, back-up display 222 may be integrated with mirror 104 or center stack electronics 106 shown in FIG. 1. Back-up display electronics 220 can receive display information from a back-up camera, another display source, or control circuit 206. Back-up display electronics 220 can cause back-up display 222 to controllably display video images or graphical indicia. For example, a video camera mounted at the rear of the vehicle and communicably coupled to back-up display electronics 220 can send video images to back-up display electronics 220 when the vehicle is in reverse, and back-up display may be configured to display the images. In response to receiving status information from remote electronic system 112, control circuit 206 can determine whether or not to provide an update of status to back-up display 222. In other embodiments, control circuit 206 may always provide an update of status to back-up display 222 in response to status information received from remote electronic system 112. Back-up display electronics 220 can receive status information from control circuit 206 and can use the received status information to cause back-up display 222 to display an indication of the status (e.g., cause one or more icons, logos, symbols or animations to be shown on the display, cause a text display indicating garage door status to display, etc.). Back-up display electronics 220 may be configured to cause the various types of back-up display 222 states/displays as shown and described in FIGS. 5-10.

Back-up display 222 may be or include an organic LED (OLED) display, a liquid crystal display (LCD), or other display elements suitable for providing back-up images from back-up display electronics 220. Back-up display 222 may be installed on, for example, a rearview mirror assembly. In other exemplary embodiments, display 222 may be installed in a vehicle dashboard or center stack location. In an exemplary embodiment, back-up display 222 may be the main media or informatics display in the vehicle.

Figure 3:
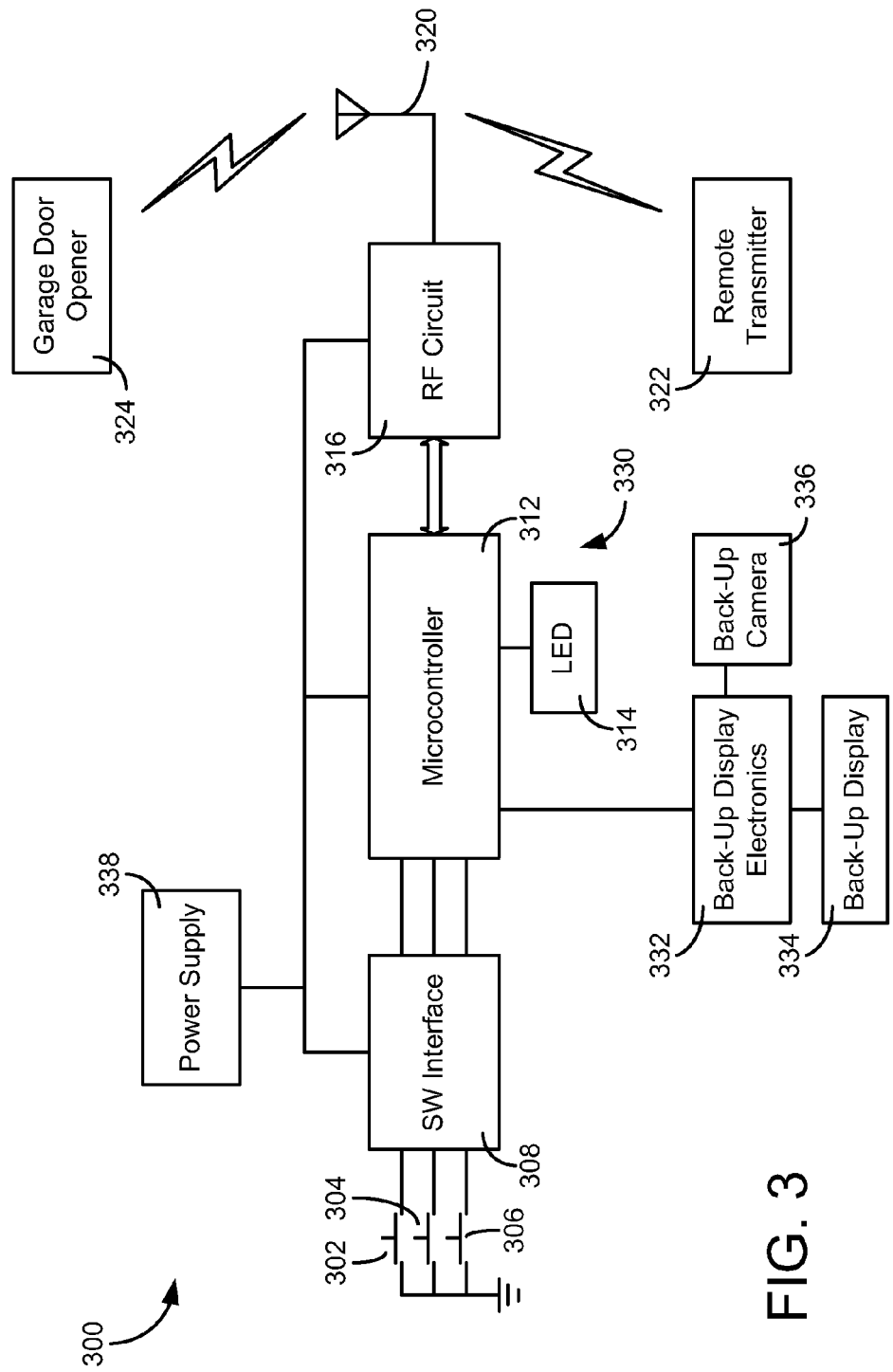
FIG. 3 is a schematic diagram of an electrical circuit of a trainable transceiver of the wireless control system, according to an exemplary embodiment.

Referring now to FIG. 3, a schematic diagram of an electrical circuit of a trainable transceiver 300 is shown, according to an exemplary embodiment. Trainable transceiver 300 may be a more detailed diagram of, e.g., transceiver circuit 208 of wireless control system 102 of FIGS. 1-2, or may be a separate embodiment. Trainable transceiver 300 includes a switch interface (SW) circuit 308 connected to one terminal of each of push button switches 302, 304, 306. Transceiver circuit 330 of trainable transceiver 300 further includes an RF circuit 316 coupled to microcontroller 312 and to an antenna 320. Each of switches 302, 304, 306 may be correspond to a different remote device to be controlled such as different garage door openers or a varying set of remote devices (e.g., garage door opener 324, an electrically operated access gate, and house lighting controls). Each remote device controllable by trainable transceiver 300 may have its own unique operating RF frequency, modulation scheme, and/or security code. Thus, switches 302, 304, 306 may correspond to a different radio frequency channel for trainable transceiver 300. Microcontroller 312 is coupled to an LED 314 and may be configured to light LED 314 in response to actuation of switches 302, 304, 306. Antenna 320 may be configured (e.g., tuned) to receive RF energy from a remote transmitter 322 during training. Antenna 320 may be configured (e.g., tuned) to transmit RF energy to a garage door opener 324 or other remote device in response to switch actuation that commands a transmission.

Microcontroller 312 is communicably coupled (e.g., directly, indirectly, etc.) to back-up display electronics 332. Back-up display electronics 332 can drive back-up display 334 using analog or digital video signals. Back-up display electronics 332 may further be connected to back-up camera 336 and receive input from camera 336 for use by microcontroller 312 and trainable transceiver 300. Trainable transceiver 300 further includes a power supply 338 which may be any type of power supply (e.g., battery, AC or DC power supply, etc.).

Systems such as those described above with reference to FIGS. 1-3 may be incorporated as a feature into a vehicle to provide users with easy access to wireless devices. For example, the embodiments of FIGS. 1-3 may be incorporated into a rear view mirror for a vehicle. It should be appreciated that the microcontroller and/or RF circuit may be installed at a first vehicle location (e.g., overhead console location, visor location, etc.) while the user interfaces and displays may be installed in other locations (e.g., a rear view mirror, a center stack, an instrument console, etc.). Varying combinations of installation locations for the systems of FIGS. 1-3 may be within the scope of one or more appended claims.

Referring generally to FIGS. 4-10, exemplary rear view mirrors for a vehicle are shown and described. A rear view mirror assembly may include a back-up display for displaying back-up video from a back-up camera. In addition to being configured to display back-up video, the back-up display may be controllably utilized for displaying wireless control system status information. For example, garage door status information may be displayed on the rearview mirror assembly using the back-up display. The status information may be caused to be displayed by the wireless control system's control circuit in response to status information received from a remote control system. In other embodiments, the status information may be derived from a status maintained or detected by the vehicle (e.g., using infrared sensors, laser sensors, sonic sensors, radar, etc.). The status information may be displayed as text, graphics or animations. The status information may further be conveyed via an audio output. In an exemplary embodiment, the status information may be recalled via a button press or other command.

Figure 4:
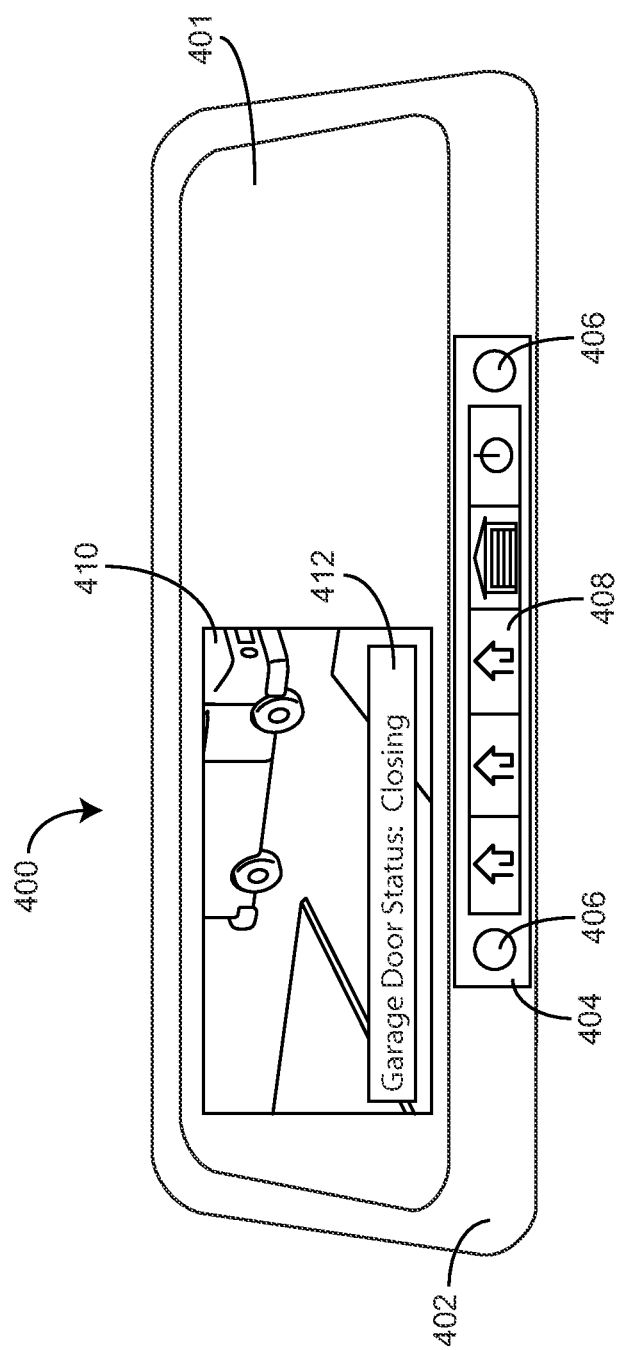
FIG. 4 is an embodiment of a rear view mirror assembly of a vehicle, according to an exemplary embodiment.

Referring now to FIG. 4, one such embodiment of an rearview mirror assembly is shown. Rearview mirror 400 may have a reflective surface 401 encased in a frame or bezel 402. Frame 402 includes a panel 404 including user inputs 408. User inputs 408 may correspond to different devices and remote electronic systems (e.g., a garage door system, a security system, etc.). User inputs 408 may correspond to switches 302, 304, 306 of FIG. 3. User inputs 408 may include a logo, icon, indicia, or graphics to identify the corresponding device (e.g., a house icon to indicate a security system or a HOMELINK system, a garage door icon to indicate a garage door system, etc.). The logos or icons may be backlit with one or more illumination sources or LEDs. Selection of a user input 408 may trigger a backlighting of the input, indicating selection of the input. Alternatively or additionally, LEDs 406 or other lighting fixtures may be included in panel 404 and may light up upon operation of user inputs 408. Rearview mirror 400 further includes back-up display 410 which may be integrated or implemented within reflective surface 401.

Back-up display 410 is shown occupying the left portion of reflective surface 401. In an exemplary embodiment, back-up display 410 may be located behind the reflective surface and may normally be in an off state such that the reflective surface operates fully and exclusively as a mirror. Back-up display 410 may be visible through the reflective material only when display 410 is active and illuminated (e.g., via backlighting). According to various exemplary embodiments, back-up display 410 may occupy the right portion of reflective surface 401, the lower or upper portion of surface 401, or any combination of areas on surface 401. Back-up display 410 is normally configured to provide back-up video while the vehicle is in reverse. Back-up display 410 may also display remote device status at a remote device status portion 412 of the display. As shown in FIG. 4, remote device status portion 412 reads "Garage Door Status: Closing".

In an exemplary embodiment, the remote device status text is only shown while the vehicle is in reverse and while the back-up display is active and showing video from a back-up camera. In other embodiments, back-up display 410 is activated for display of remote device status via portion 412. In some embodiments, only the backlighting associated with portion 412 is active when the vehicle is not in reverse. Accordingly, the text of portion 412 may be shown while back-up display 410 areas other than portion 412 are not shown through the reflective material.

Referring generally to FIGS. 5-10, various embodiments are shown which include displays 501 (e.g., a back-up display for a vehicle) for providing information received from a remote electronic system (e.g., a garage door system). Displays 501 are shown coupled to (e.g., attached to, integrated within, etc.) an rearview mirror assembly. Displays 501 are configured to provide vehicle information and remote electronic system information on reflective element 505. The mirror assemblies of FIGS. 5-10 are shown without a frame or bezel and have selectable inputs or buttons corresponding to a reflective element displayed on a reflective surface of the rearview mirror. Further, displays 501 may be coupled to electronics configured to control the activities of displays 501. For example, back-up display electronics 220 of FIG. 2 may be configured to control displays 501 in the embodiments of FIGS. 5-10. In the embodiments of FIGS. 5-10, a scene or back-up video is not shown in displays 501 for the sake of clarity; it should be understood that displays 501 may display such a scene in addition to the other elements shown in FIGS. 5-10.

Figure 5:
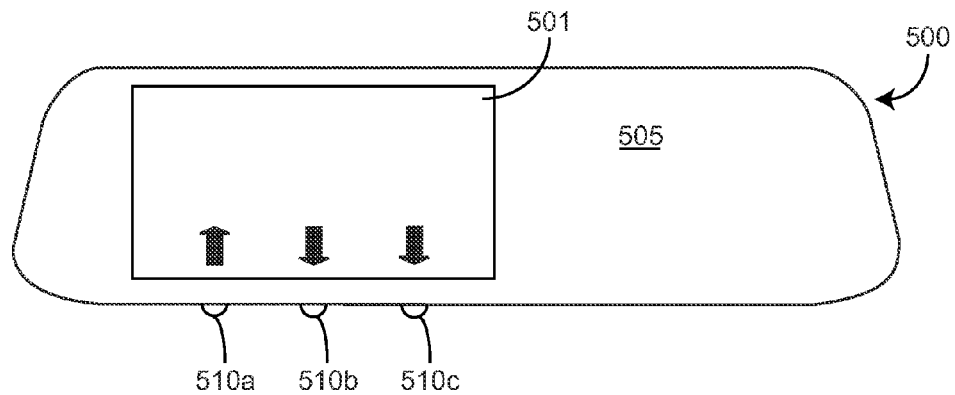
FIG. 5 is an embodiment of a rear view mirror assembly of a vehicle, according to another exemplary embodiment.

Referring now to FIG. 5, an exemplary rearview mirror assembly is shown, according to one exemplary embodiment. Mirror assembly 500 includes reflective element 505 and inputs 510a, 510b, 510c. Reflective element 505 may be partially transmissive, partially reflective, transflective, etc. such that objects behind the element may be viewed, while at least partially maintaining the reflectivity of the element to act as a mirror. Moreover, reflective element 505 may be electrochromatic or any other type of reflective element. Display 501 integrated within or behind reflective element 505 may be used to display icons, text, or other images on or through reflective element 505. In an exemplary embodiment, display 501 may be a back-up display that may be caused to display a video scene from a back-up camera. In the embodiment of FIG. 5, arrows are overlaid on the video scene to indicate a status of the remote devices controlled by the trainable transceiver. For example, the left-most arrow is illustrated to point up and therefore indicates that the garage door associated with button 510a is in an "OPEN" state. The middle and right arrows above buttons 510b, 510c are illustrated to point down and therefore indicate that the garage doors associated with buttons 510b, 510c are "CLOSED". The status information may be communicated to electronics for the back-up display from a control circuit for the trainable transceiver. Garage door status determinations may be made as described with reference to the other Figures of this specification.

Mirror assembly 500 does not have a traditional frame or bezel, compared to mirror 400 of FIG. 4. Mirror assembly 500 appears without a significant retaining bezel and provides nearly full reflectivity on the face of reflective element 505. Without a retaining or structurally supporting bezel, the inputs (or buttons) 510a, 510b, 510c may no longer be located on the bezel itself. Rather, inputs 510a, 510b, 510c are relocated to the structure or housing now supporting reflective element 505 as illustrated. It is understood that the number of inputs and location of the inputs is not limited to the depicted embodiment, but may include any number of inputs and any location as readily understood by the skilled artisan. For example, more or less inputs may be provided based on the number of remote electronic systems the vehicle may communicate with, and inputs 510a, 510b, 510c may be located anywhere on mirror assembly 500.

Figure 6:
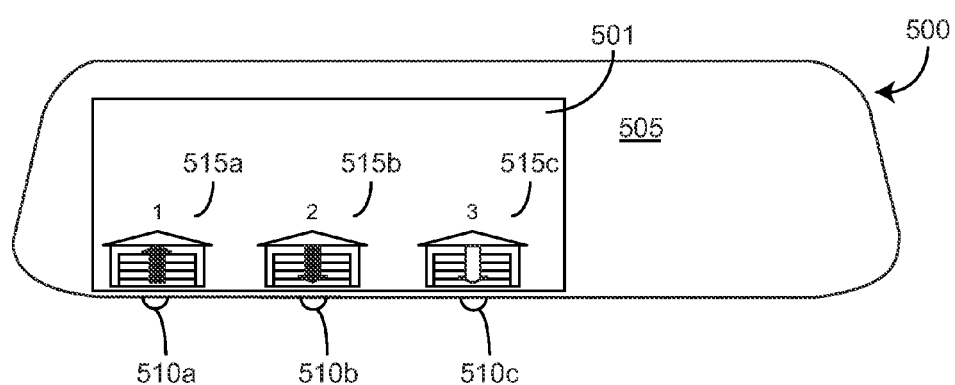
FIG. 6 is an embodiment of a rear view mirror assembly of a vehicle, according to another exemplary embodiment.
Figure 7:
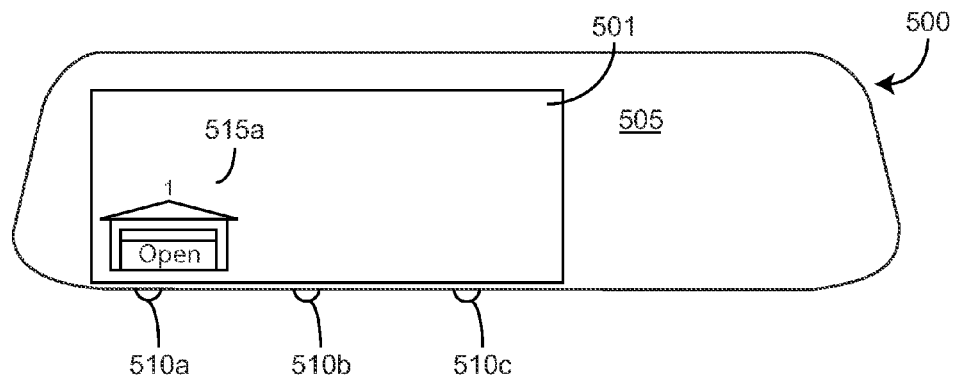
FIG. 7 is an embodiment of a rear view mirror assembly of a vehicle, according to another exemplary embodiment.

Referring now to FIG. 6, an exemplary rearview mirror assembly is shown, according to another exemplary embodiment. Mirror assembly 500 includes reflective element 505 with display 501. Display 501 may primarily be used as a back-up display for showing a video capture from a back-up camera. Mirror assembly 500 further includes inputs 510a, 510b, 510c. Display 501 is illustrated as graphically displaying remote device status symbols 515a, 515b, 515c. In the example of FIG. 6, graphical display symbols 515a, 515b, 515c are shown as garage doors with arrows (e.g., arrows overlaid on the garage door graphics). According to other exemplary embodiments, symbols 515a, 515b, 515c may be of varying graphical shapes or designs for representing the remote electronic system associated with the symbol (e.g., garage door system, security system, lighting systems, etc.). For example, if the remote electronic system associated with the symbol is a lighting system, then "on" or "off" lightbulb graphics may be displayed on display 501.

Graphical display symbols 515a, 515b, 515c are activated and deactivated from being shown on the screen 501, for example, in response to user or automatic selection of a corresponding input 510a, 510b, 510c, start of an ignition in the vehicle, opening of a vehicle door, upon voice demand (e.g., "show me garage door status"), etc. If a first garage door is open, a symbol 515a corresponding with the garage door may be shown to alert the driver that the garage door is open. As another example, upon user selection of an input (e.g., input 510a), symbol 515a may be shown to indicate selection of the input, and may further change a display state depending on the status of the garage door system.

The user may select and determine which of the aforementioned systems enable activation of the symbols, as well as the length of activation of the symbols. For example, when a state changes for a particular system (e.g., garage door system, security system, lighting system), graphical display symbols 515a, 515b, 515c may automatically be enabled to change states if the user presets the trainable transceiver system (e.g., via inputs to rearview mirror 500) to provide the information within display 501. Graphical display symbols 515a, 515b, 515c may indicate that a device operated by inputs 510a, 510b, 510c is being controlled. Moreover, the brightness and color of the graphical display symbols may not be limited to a single level. Rather, brightness and color may be tied to various factors, such as amount of ambient light, user selection, headlamp status, user movement, or any other factor. For example, for a graphical display symbol representing garage door status, the graphical display symbol may be a different color or shown with a different intensity based on whether the garage door is open, closed, or transitioning between an open state and a closed state. In the embodiment of FIG. 6, arrows for symbols 515a, 515b are shown shaded in, indicating an inactive state of the garage door, while symbol 515c has an arrow not shaded in, indicating the garage door is currently closing. Sensed ambient light may also determine the intensity of the graphical display symbol. The graphical display symbols may shown on display 501 in any form, shape, or pattern, including characters, symbols, numbers, etc., and are not limited to the specific embodiments illustrated in the figures.

According to one exemplary embodiment, graphical display symbols 515a, 515b, 515c may be animated (e.g., the symbols may change appearance on the display 501). For example, now referring to FIG. 7, graphical display symbol 515a may be a graphical animation of a garage door opening, with the final frame of the graphical animation being an open garage door having "open" text (as shown). The word "opening" may be displayed on graphical display symbol 515a during the animation and while the garage door is opening.

Figure 8:
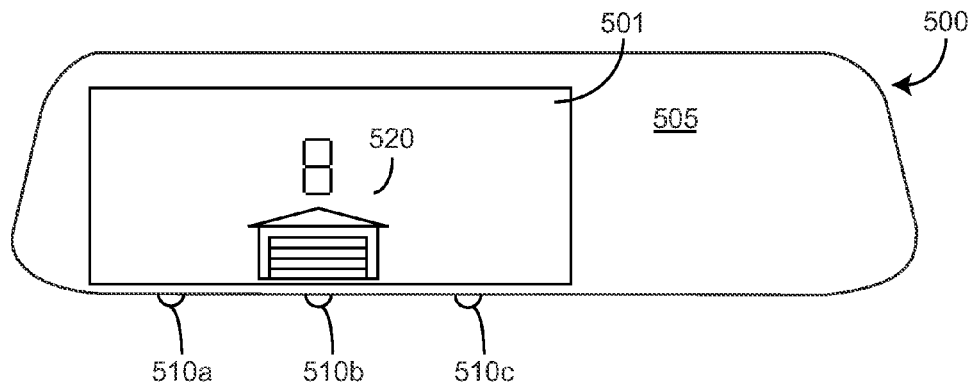
FIG. 8 is an embodiment of a rear view mirror assembly of a vehicle, according to another exemplary embodiment.

Referring now to FIG. 8, an exemplary rearview mirror assembly is shown, according to yet another exemplary embodiment. Compared to the mirror assembly of FIGS. 6-7, instead of providing multiple symbols 515a, 515b, 515c corresponding to inputs 510a, 510b, 510c, mirror assembly 500 of FIG. 8 includes a single graphical display symbol 520 that may correspond with any one of or all inputs 510a, 510b, 510c. For example, if input 510a is selected, graphical display symbol 520 is activated within display 501 such that it becomes visible to the user. Additionally, graphical display symbol 520 may display a number (depicted in the illustrated embodiment) that corresponds to input 510*a*. For example, symbol 520 may be activated and may be configured to show the number "1," when first input 510*a* is selected. Additionally, since each input(s) may correspond to a specific device, such as a garage door, lights, etc., the symbol shown may change. For example, a garage door icon is shown in FIG. 8, but upon selection of the appropriate input, a different icon may then appear in the place of the garage door icon. Similar to the embodiment in FIG. 6, graphical display symbol 520 may be substantially or completely hidden (i.e., not visible) to a person viewing mirror assembly 500 when the mirror assembly is mounted in the vehicle, and when graphical display symbol 520 is not activated. This enables mirror assembly 500 to be fully utilized as a rearview mirror without distraction on part of a user.

As described above, graphical display symbol 520 may be a reconfigurable display. For example, graphical display symbol 520 may include a seven-segment indicator (represented by the block "8" in FIG. 8) that is capable of indicating which of the corresponding inputs 510*a*, 510*b*, 510*c* (which inputs correspond to a device, as described above) has been selected. The seven-segment indicator and garage door icon shown in FIG. 8 may be activated/deactivated together or separately to create different visual responses. Additionally, the color (or multiple colors), brightness, activity, etc. of the seven-segment indicator and garage door icon of graphical display symbol 520 may be the same or provided differently for visual response or otherwise. Other text, characters, symbols, etc. may also be displayed as part of graphical display symbol 520. Graphical display symbol 520 may also be configured to display for a predetermined or user selectable amount/length of time.

Figure 9:
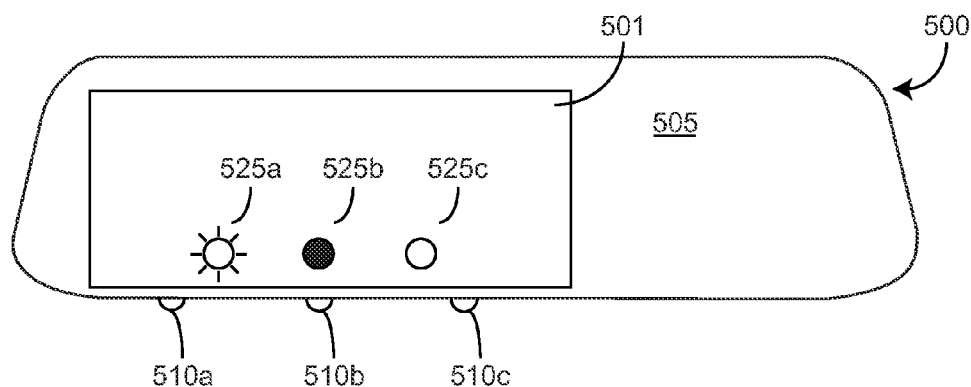
FIG. 9 is an embodiment of a rear view mirror assembly of a vehicle, according to another exemplary embodiment.

Referring now to FIG. 9, an exemplary rearview mirror assembly is shown, according to yet another exemplary embodiment. Display 501 of FIG. 9 includes graphical display symbols 525*a*, 525*b*, 525*c* (e.g., indicators). Graphical display symbols 525*a*, 525*b*, 525*c* may be used to indicate a status based on the color and brightness of the symbols, blinking of the symbols, or other display properties. The driver of the vehicle may understand the meaning of the various display properties of the symbols. For example, the driver may recognize that blinking of an graphical display symbol 525*a* may indicate that a garage door is changing states by either opening or closing. Further, if an graphical display symbol 525*b* is darkened or "filled in", the driver may recognize that the corresponding garage door is closed, and if an graphical display symbol 525*c* is light or "empty", the driver may recognize that the corresponding garage door is open.

Although graphical display symbols 525*a*, 525*b*, 525*c*, as illustrated in the embodiment, are displayed (when activated) as a single light, the graphical display symbols may appear in any desired shape or pattern, and in any color or combination of colors. Additionally, the graphical display symbols may have a brightness that varies with ambient light or is set to a desired level.

Display 501 may also be touch sensitive. For example, a user may be able to operate a remote system when the user touches an area where a graphical display symbol is currently visible. Display 501 may use non-contact technology (e.g., optical, capacitive, resistive) to determine user proximity to display 501 and activation of inputs 510*a*, 510*b*, 510*c*. The symbols may be visible all the time or only for a variable period of time. The symbol may be made visible for a variable period of time based on another input from the vehicle, such as opening the door, turning on interior lights, starting the car, etc. The method of activation and length of time may be programmable by a user, such as from a vehicle message center.

Figure 10:
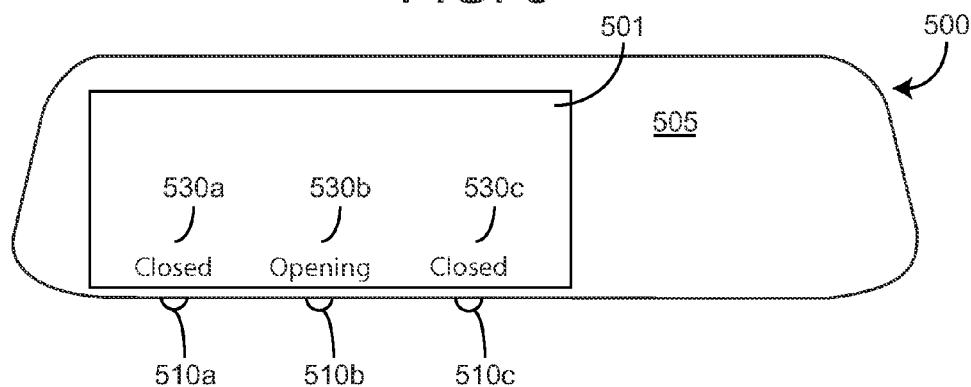
FIG. 10 is an embodiment of a rear view mirror assembly of a vehicle, according to another exemplary embodiment.

Referring now to FIG. 10, an exemplary rearview mirror assembly is shown, according to yet another exemplary embodiment. In the embodiment of FIG. 10, display 501 includes text 530*a*, 530*b*, 530*c* which provides a textual representation of system statuses. For example, in the embodiment of FIG. 10, text may be visible that indicates a garage door status (e.g., open, closed, opening, closing). Text 530*a* indicates that a first garage door is closed, text 530*b* indicates that a second garage door is currently opening, and so forth. According to one exemplary embodiment, text 530*a*, 530*b*, 530*c* may be made visible when there is a current change in garage door status (e.g., the garage door opening or closing) and then fade or disappear when the change is complete.

Referring generally to FIGS. 5-10, an audio system may be integrated into rearview mirror assembly 500. For example, in addition to or in place of providing a symbol or icon on display 501, a speaker or other audio output may audibly relay status information. For example, upon pressing an input 510*a*, for example, an audio output that relays the status of a corresponding garage door may be provided to the driver.

Figure 11:
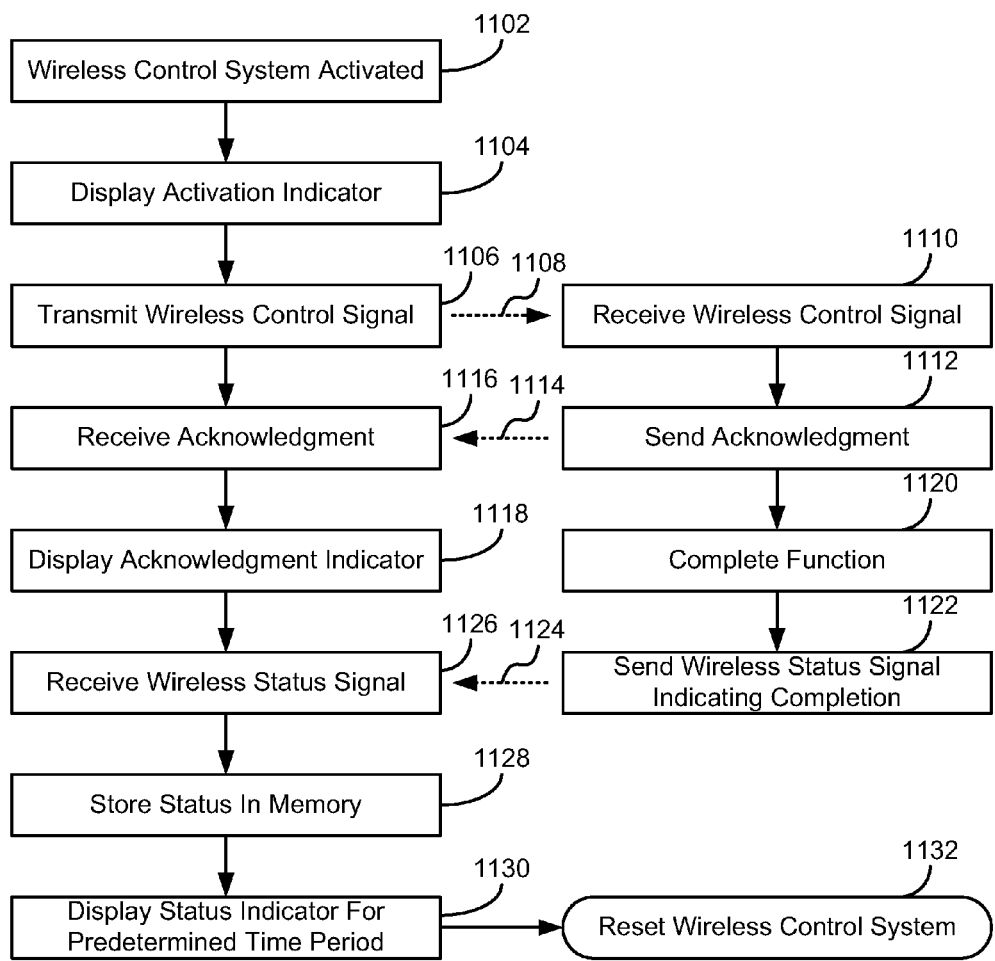
FIG. 11 is a flow chart of a process for receiving a signal from a remote electronic system in response to transmittal of a wireless control, according to an exemplary embodiment.

In operation, wireless control system 102 is configured for wireless control of remote electronic system 112. Wireless control system 102 is configured to monitor the status of the control operation and to communicate that status to a user of wireless control system 102. For example, wireless control system 102 can be configured to transmit a wireless control signal from a vehicle to a garage door opener. Referring now to FIG. 11, a flow chart of a process 1100 for receiving a signal from a remote electronic system (e.g., a remote electronic system for a garage door opener) in response to transmittal of a wireless control signal is shown, according to an exemplary embodiment. At a step 1102, wireless control system 102 is activated. According to an exemplary embodiment, activation of wireless control system 102 can include depression of a push button switch (e.g., inputs 510*a*, 510*b*, 510*c*) attached to a vehicle interior element (e.g., rearview mirror 500). According to alternative embodiments, activation can include depression of a button on a handheld wireless transmitter (e.g., keyfob, mobile device, etc.), use of a voice command, or any other user input.

According to yet another embodiment, activation may be automated. For example, in a wireless control system including a navigation input device, wireless control system 102 may be configured to transmit the wireless control signal whenever the transmitter is within a predetermined distance to or from the location of remote electronic system 112. Other examples of automation may include sending the signal based upon timing information, based on time of day information, or based on any other event-driven or user determined transmittal of the wireless control signal.

At a step 1104, control circuit 206 can turn on a display (e.g., elements on display 501 shown in FIGS. 5-10) that indicates to the user that wireless control system 102 has been activated. Alternative embodiments can include different feedback to the user dependent on the feedback capability associated with wireless control system 102. For example, where wireless control signal 102 includes a display capable of displaying alphanumeric characters, the display can include a message such as "SIGNAL SENT," or an audio system can audibly signal feedback to the user.

At a step 1106, control circuit 206 can transmit a wireless control signal 1108 using transceiver circuit 208. Control circuit 206 is then placed in a "listening" or receiving mode where control circuit 206 is monitoring transceiver circuit 208 to receive an acknowledgement signal from remote electronic system 112. When an acknowledgement signal is not received within a specified time (e.g., one second, five seconds, etc.), control circuit 206 can be configured to retransmit the signal without requiring another activation of operator input device 202. Periodically retransmitting wireless control signal 1108 may help the system to correct for temporary interference or lack of signal strength. Control circuit 206 may be configured to retransmit the wireless control signal for a specified number of iterations until receipt by remote electronic system 112 is acknowledged. If the number of iterations exceeds a specific number or threshold, control circuit 206 may communicate a failure to the user of the system by, for example, displaying a flashing red light on display 501.

At a step 1110, wireless control signal 1108 transmitted in step 1106 is received by remote electronic system 112 through transceiver circuit 216. Upon receipt, remote electronic system 112 may perform a verification step. If the signal is valid, remote electronic system 112 may transmit a wireless status signal 1114 (e.g., an acknowledgment signal) at step 1112 using transceiver circuit 216. In a step 1116, wireless control system 102 receives wireless status signal 1114 (e.g., the acknowledgment signal). At a step 1118, wireless control system 102 may indicate acknowledgement of the wireless control signal to the user by displaying an acknowledgement indicator (e.g., displaying a blinking yellow light on display 501). Upon receiving the acknowledgement signal, wireless control system 102 may be placed in a second listening mode where control circuit 206 is monitoring transceiver circuit 208 to receive a wireless status signal. The second listening mode can include a timing limit where control circuit 206 will indicate an error condition if the wireless status signal is not received within a predetermined time limit. If the wireless status signal is not received within the predetermined time limit, control circuit 206 may use display 204 to indicate a failure condition. According to alternative embodiments, alternative types of feedback may be used to indicate that the wireless control signal was received and acknowledged by remote electronic system 112 or that a failure condition has occurred.

After sending the acknowledgement signal at step 1112, remote electronic system 112 may perform the function designated by wireless control signal 1108 in a step 1120. For example, if remote electronic system 112 is a garage door opener, remote electronic system 112 may open or close the garage door in response to receipt of wireless control signal 1108 at step 1120. According to alternative embodiments, wireless control signal 1108 may include more robust control over remote electronic system 112. For example, for a garage door opener, wireless control signal 1108 may include an up-only control signal. An up-only control signal will only activate a garage door opener if the garage door is not already up. If the garage door is up, remote electronic system 112 may be configured to do nothing.

Following completion of the function in step 1120, remote electronic system 112 is configured to transmit a wireless status signal 1124 at step 1122. Wireless status signal 1124 may be a message indicating that remote electronic system 112 attempted to perform the function. When remote electronic system 112 has the capability to verify the success of an operation, remote electronic system 112 may await completion of the operation and then send wireless status signal 1124 including information regarding the success or failure of the function (e.g., success of the operation or reasons for failure of the operation). Information may include, e.g., garage door closed, garage door open, garage door operation failed, garage door operation failed because of obstruction, etc. In a step 1126, wireless control system 102 may receive and interpret wireless status signal 1124. The received and interpreted status signal is stored in memory in a step 1128 for later retrieval by control circuit 206. When wireless status signal 1124 indicates success, wireless control system 102 may display a status indicator which displays a corresponding success status (e.g., displaying a green light on display 501 for a period of time to indicate success) in a step 1130. Following step 1130, wireless control system 102 may reset in a step 1132.

According to alternative embodiments, feedback to the user of wireless control system 102 may take a variety of different forms including different levels of content. For example, the display screen can be used to display a message indicative of the status information received from remote electronic system 112. For example, wherein remote electronic system 112 is a garage door opener, the back-up display may display "Garage Door Close Signal Sent," "Garage Door Closing," "Garage Door Closed," and/or "Garage Door Closing Error" in response to activation of wireless control system 102. According to an alternative embodiment, feedback to the driver of the vehicle can include audible feedback to the user of wireless control system 102. Additionally, status information may be sent via text or multimedia message to a mobile device, such as a cell phone, PDA, or smartphone.

Figure 12:
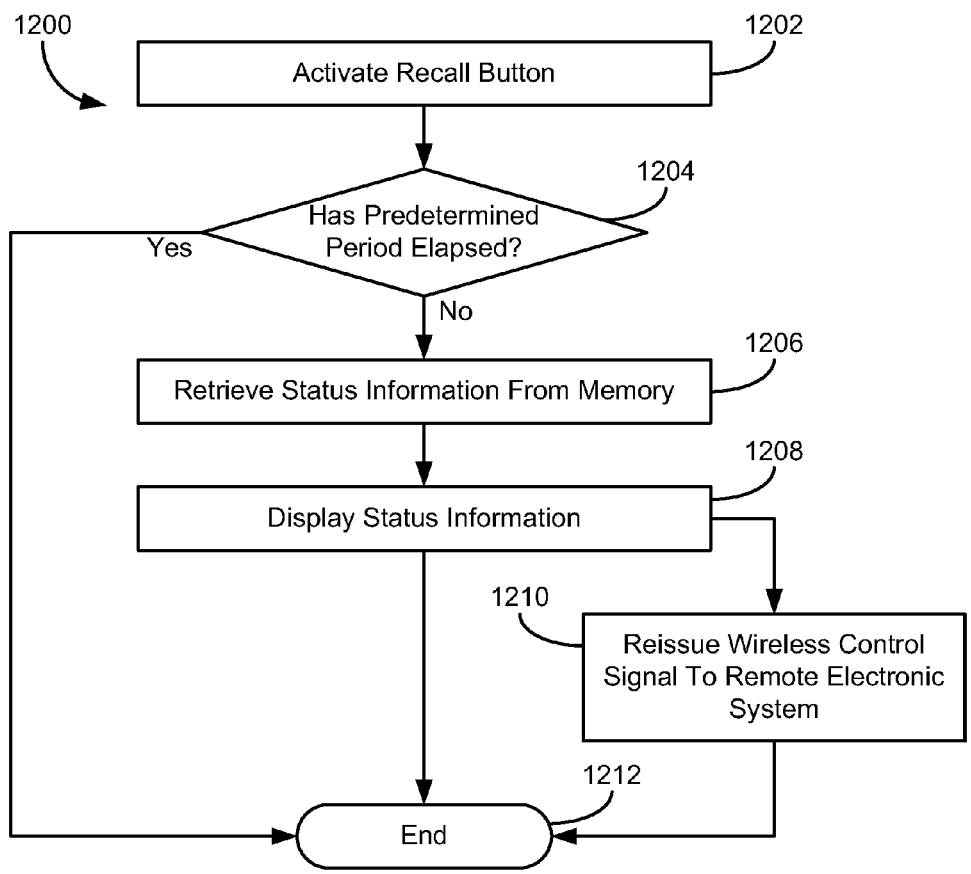
FIG. 12 is a flow chart of a process for a wireless control system recalling status information, according to an exemplary embodiment.

Referring now to FIG. 12, a flow chart of a process 1200 for a wireless control system recalling status information is shown, according to an exemplary embodiment. Process 1200 may be activated when a driver of a vehicle wishes to recall the status of a previously selected icon to activate remote electronic system 112 via wireless control system 102. For example, process 1200 may be used in the case when a driver pulls into a driveway and activates a remote electronic system, such as a garage door, removes an article from the garage, and proceeds to leave the driveway. In this scenario, the driver may forget whether remote electronic system 112 was activated and/or whether the activation was successful or a failure. The recall button enables the driver to "recall" the status information stored in memory 210 of wireless control system 102 once the vehicle has left the driveway, and is no longer within wireless range of remote electronic system 112.

In one embodiment of the recall button method, a driver activates (e.g. presses) a recall button at a step 1202. Control circuit 206 determines whether a predetermined period of time has elapsed at a step 1204. If the predetermined period of time has elapsed, the recall status information has been cleared from memory and process 1200 ends at step 1212. If the predetermined period has not elapsed, then control circuit 206 retrieves (recalls) the status information from memory 210 at a step 1206. It is understood that the predetermined period of time may be set as a default or selected by a driver of the vehicle. The recalled status information is displayed in a step 1208. In one embodiment of process 1000, the process ends at step 1212. In another embodiment of process 1200, if the status information indicates that a failure occurred, wireless control system 102 can reissue another control signal to the remote electronic system 112 at a step 1210. In this case, since wireless control system 102 is no longer within range of remote electronic system 112 using the typical RF signal, the system may utilize another type of wireless signal as readily understood. For example, wireless control system 102 may provide a control signal to a cell phone connected thereto, which in turn may issue the control signal to remote electronic system 112. Wireless control system 102 may then monitor the status of the reissued control signal in a manner similar to that described above.

Advantageously, providing a wireless status signal to a user allows the user to have security in knowing whether the intended operation was a success. For example, where a driver pushes a button to close a garage door, the driver does not have to wait until the garage door is closed before driving away. Wireless control system 102 will indicate if any problem has occurred. This feature also increases security, as some drivers will drive away without having verified that the garage door has fully closed. Where the operation fails, the garage door will remain open for the duration until the driver returns. This system will alert the drivers that there has been a failure so that they can correct the problem. Moreover, the system allows the driver to recall that status of the selected operation at a later time in the event the driver fails to remember whether a selected operation occurred. For example, selection of the recall button (extra button, longer button hold or two quick presses of a single button) allows the system to recall whether the button was selected up to a predetermined period of time from leaving the home.

Figure 13:
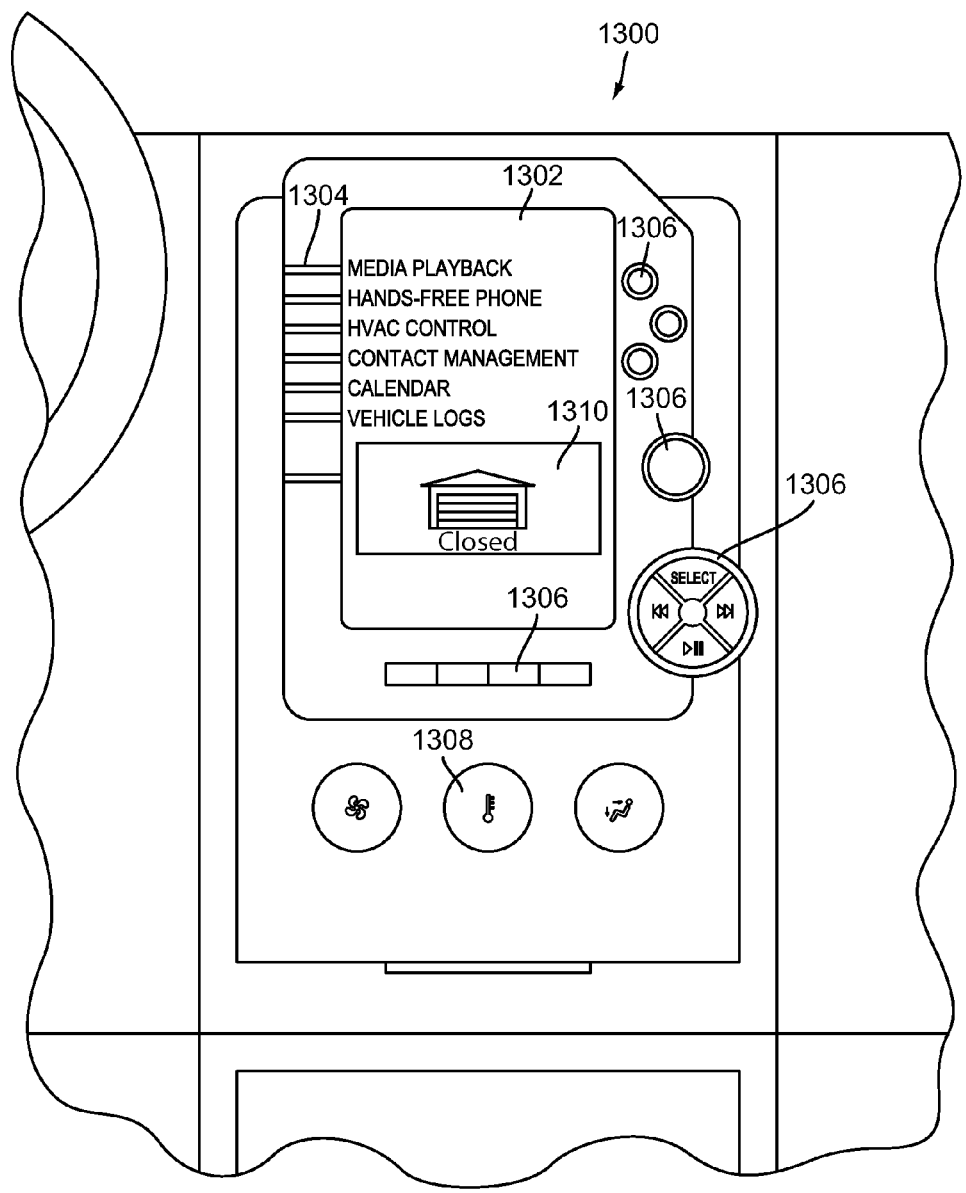
FIG. 13 is an embodiment of a vehicle control system, according to an exemplary embodiment.

According to various exemplary embodiments, the back-up display of FIGS. 5-10 may alternatively or additionally be installed in other vehicle systems. Referring now to FIG. 13, a vehicle control system 1300 (e.g., a center stack display that may be located in the front center of a vehicle) is shown, according to an exemplary embodiment. System 1300 includes an output display 1302 and multiple knobs and pushbuttons 1304, 1306, 1308 which facilitate controlling various vehicle functions and remote electronic system functions. Output display 1302 may be configured to display data related to the control of vehicle and remote electronic system functions. In one exemplary embodiment, output display 1302 may be a touch-screen display or a non-touch sensitive display. In other exemplary embodiments, output display 1302 may be of any technology (e.g., LCD, DLP, plasma, CRT), configuration (e.g., portrait or landscape), or shape (e.g., polygonal, curved, curvilinear). Output display 1302 may be a manufacturer installed output display, an aftermarket output display, or an output display from any source. Output display 1302 may be an embedded display (e.g., a display embedded in the control system or other vehicle systems, parts, or structures), a standalone display (e.g., a portable display, a display mounted on a movable arm), or a display having any other configuration. Knobs and pushbuttons 1304, 1306, 1308 may be configured to control vehicle or remote electronic system functions. For example, the operation of a pushbutton 1304 may result in a display of various functions corresponding to the listed vehicle sub-system (e.g., media playback, hands-free phone, etc.).

Output display 1302 is shown to display various options (e.g., "media playback", "hands-free phone", etc.) from which the user may select with one of knobs or pushbuttons 1304, 1306, 1308. Further, output display 1302 further includes a sub-display 1310 which may provide a display relating to a remote electronic system. For example, sub-display 1310 may be used as a back-up display as described in the present disclosure. In the embodiment of FIG. 13, sub-display 1310 is configured to show an icon or symbol of a garage door, representing a garage door system, and text relating to the status of the garage door system. Sub-display 1310 may then be configured to display a garage door status using the icon or symbol. For example, sub-display 1310 may display an animated icon, text, or a symbol as described in the embodiments of display 501 of FIGS. 5-10. Sub-display 1310 may be displayed in any area within display 1302, and may additionally be associated with one or more knobs or pushbuttons 1304, 1306, 1308.

Figure 14:
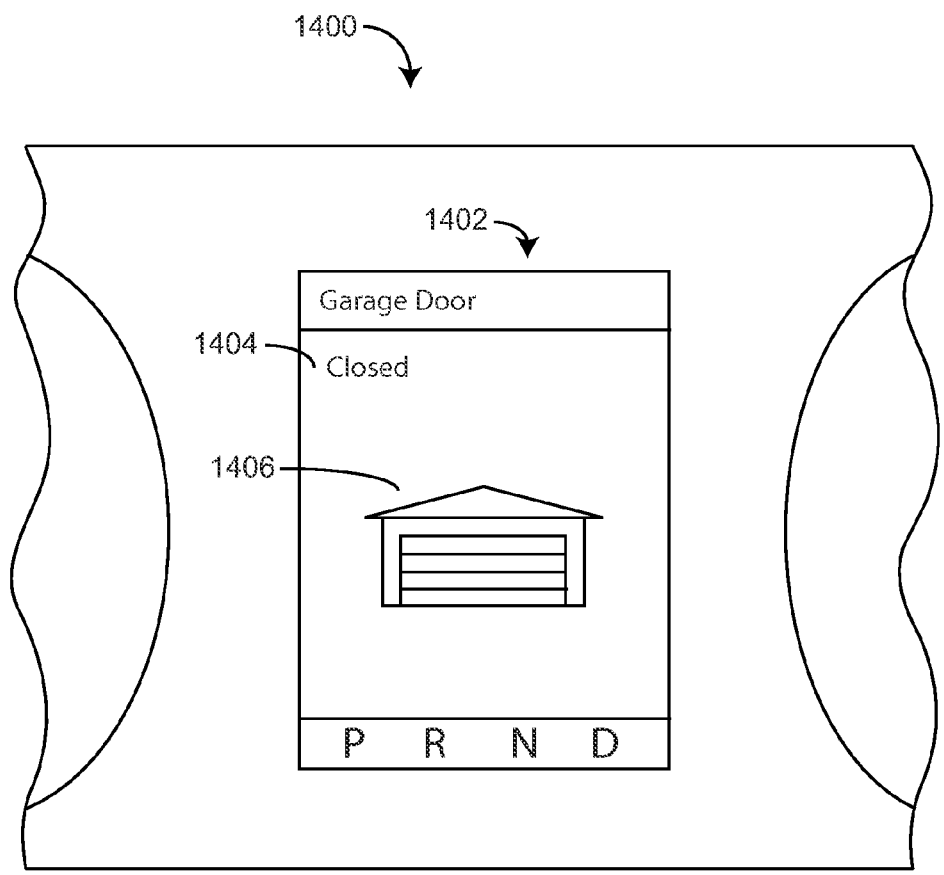
FIG. 14 is an embodiment of a dashboard including a back-up display that displays garage door status information, according to an exemplary embodiment.

The back-up display as described in the present disclosure may further be installed within, for example, a dashboard of a vehicle. Referring now to FIG. 14, a dashboard 1400 is shown which includes a back-up display 1402 that may display garage door status information as described in the present disclosure. Display 1402 may include a text portion 1404 and a symbol portion 1406 which allows display 1402 to convey remote electronic system information on dashboard 1400. Text portion 1404 may include information about the type of remote electronic system for which information is being displayed (e.g., "Garage Door") as well as an indication of the remote electronic system status (e.g., "Closed"). Symbol portion 1406 may display one or more symbols or icons relating to the remote electronic system status. For example, a garage door icon (e.g., an icon similar to the icon described in the embodiments of FIGS. 5-10) may be displayed in portion 1406. Back-up display 1402 may be integrated with another display system of the vehicle. For example, in dashboard 1400, back-up display 1402 also includes a section which shows if the vehicle is in neutral, park, drive, etc. Back-up display 1402 may be integrated with any other display element on dashboard 1400.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for coupling to a vehicle and for causing actuation of a remote device via a control signal transmission, comprising:
   a transmitter for causing the control signal transmission to the remote device;
   a receiver configured to receive status information from the remote device; and
   a circuit configured to:
      determine a status of the remote device based on the received status information; and
      while the vehicle is in reverse, cause a back-up display to indicate the status of the remote device in response to determining the status.

2. The system of claim 1, further comprising:
   wherein the status determination comprises using the circuit to recognize the information as an indication of remote device status.

3. The system of claim 1, wherein the back-up display is coupled to a rear view mirror.

4. The system of claim 1, wherein the back-up display is embedded within at least one of an instrument panel and a center stack.

5. The system of claim 1, wherein the status determination comprises receiving an acknowledgement in response to the control signal transmission to the remote device.

6. The system of claim 1, wherein the back-up display's primary purpose is to display video from a back-up camera while the vehicle is in reverse.

7. The system of claim 1, wherein the indication of status is an animation of the remote device.

8. The system of claim 1, wherein the remote device is a garage door, and wherein the animation shows a graphical representation of a garage door raising or lowering, depending on the state of the garage door.

9. The system of claim 1, wherein the indication of status is an icon illustrating the status.

10. The system of claim 1, wherein the indication of status is a text description of the status.

11. The system of claim 1, wherein the remote device is a garage door opener and the status indication reports the status of the garage door as open or closed.

12. The system of claim 1, wherein the remote device is a garage door opener and the status indication reports the status of the garage door as open, opening, closed, or closing.

13. A method for use by a vehicle control system, comprising:
   causing a transmitter of the vehicle control system to transmit a control signal to a remote device;
   receiving, at a receiver of the vehicle control system, status information from the remote device;
   using a circuit of the vehicle control system to determine a status of the remote device based on the received status information; and
   while the vehicle is in reverse, updating a status indication for the remote device on a back-up display in electronic communication with the circuit in response to determining the status.

14. The method of claim 13, wherein the status determination comprises the step of:
   using the circuit to recognize the information as an indication of remote device status.

15. The method of claim 13, wherein the back-up display is coupled to a rear view mirror.

16. The method of claim 13, wherein the back-up display is embedded within at least one of an instrument panel and a center stack.

17. The method of claim 13, wherein the status determination comprises receiving an acknowledgement in response to the control signal transmission to the remote device.

18. The method of claim 13, wherein the back-up display's primary purpose is to display video from a back-up camera while the vehicle is in reverse.

19. A system for a vehicle, comprising:
   a trainable transceiver;
   a back-up display; and
   back-up display electronics for controlling the back-up display;
   wherein the trainable transceiver is configured to wait for an acknowledgement after transmitting a command to a remote device;
   wherein the trainable transceiver is configured to report a status indication of the state of the remote device on the back-up display by providing information to the back-up display electronics and in response to whether or not the acknowledgement is received; and
   wherein, in response to receiving the information from the trainable transceiver, the back-up display electronics are configured to cause the back-up display to display the status indication while the vehicle is in reverse.

20. The system of claim 19, wherein the back-up display is coupled to a rear view mirror and wherein the back-up display's primary purpose is to display video from a back-up camera while the vehicle is in reverse.

* * * * *